US006321136B1

(12) United States Patent
Faguy et al.

(10) Patent No.: US 6,321,136 B1
(45) Date of Patent: Nov. 20, 2001

(54) FEEDING CONTROL FOR AN IMAGE REPRODUCTION APPARATUS OPERABLE IN SIMPLEX AND DUPLEX REPRODUCTION MODES

(75) Inventors: Gary Arthur Faguy, Hamilton; Edward Thomas Bloomer, Etobicoke, both of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/447,050

(22) Filed: Nov. 23, 1999

(51) Int. Cl.[7] .............................. G06F 7/00; G65H 29/00

(52) U.S. Cl. ........................... 700/223; 271/185; 271/186

(58) Field of Search .............................. 700/223; 271/3.1, 271/3.19, 9.01, 9.04, 131, 133, 165, 186, 291, 185, 184

(56) References Cited

U.S. PATENT DOCUMENTS

| | | | |
|---|---|---|---|
| 4,125,325 | | 11/1978 | Batchelor et al. . |
| 4,278,344 | | 7/1981 | Sahay . |
| 4,355,880 | | 10/1982 | Stemmle . |
| 4,384,782 | | 5/1983 | Acquaviva . |
| 4,468,114 | | 8/1984 | Pels et al. . |
| 4,508,447 | * | 4/1985 | Doery ................................ 271/3.1 X |
| 4,553,828 | | 11/1985 | Burger et al. . |
| 5,296,908 | * | 3/1994 | Hatano et al. .................. 271/186 X |
| 5,784,680 | * | 7/1998 | Taruki .............................. 271/391 X |
| 6,098,977 | * | 8/2000 | Sato et al. ........................ 271/186 X |

* cited by examiner

*Primary Examiner*—Christopher P. Ellis
*Assistant Examiner*—Gene O. Crawford
(74) *Attorney, Agent, or Firm*—Oliff & Berridge, PLC

(57) ABSTRACT

An automatic document feeder is operable in a simplex, or one-sided, reproduction mode and a duplex, or two-sided, reproduction mode. In the duplex mode, the original document sheets are transported through the feed path only twice and output in the same relative page order in which the sheets were input. By this, 100% productivity can be achieved. The feeder assembly uses two separate feeders, one simplex top feeder and one duplex top feeder, to obtain two pass operation. Alternatively, a single feeder is used that can feed from both the top of the stack or from the bottom of the stack depending on the mode of reproduction. A controller allows selection between the simplex and duplex modes and controls the feeding assembly based on the selection.

55 Claims, 3 Drawing Sheets

FEEDING CONTROL FOR AN IMAGE REPRODUCTION APPARATUS OPERABLE IN SIMPLEX AND DUPLEX REPRODUCTION MODES

BACKGROUND OF THE INVENTION

1. Field of Invention

This invention relates to an image reproduction apparatus that can operate in a simplex, or one-sided, reproduction mode and a duplex, or two-sided, reproduction mode. More particularly, this invention relates to handling the feed path of the original document to control output of the original document.

2. Description of Related Art

To accomplish duplex copying, it is generally necessary to invert the original document to effect reproduction of both sides of the document. Inversion adds time to each copy job and generally requires a longer feed path with additional hardware elements to invert the document and control the elements in the assembly.

Duplex copying can reproduce both sides of an original document, either on a single sheet (two-sided reproduction) or on two different sheets (one-sided reproduction). With either type of reproduction, it is desirable to output the original document and the reproduced pages in the same order and orientation as the original input documents. When original documents are inverted during reproduction, it has been necesary to pass the original document sheets back through the feed path to output the sheets to face the same direction and be in the same page order as when input.

In Many conventional duplex reproduction devices, the original document is fed through an extended feed path in which one side of the original document is reproduced and then the original document is flipped over and returned to an original supply tray for reproduction of the other side. During the second pass the document is again inverted and output. One such example is shown in U.S. Pat. No. 4,125,325 to Batchelor et al. that uses a deflector to direct sheets bearing a reproduced image facing a first direction to a return transport that delivers the reproduced sheets facing a second, opposite direction to an auxiliary supply tray for duplex copying. However, such an extended feed path requires additional space within the device and time to transport the copied sheets to the auxiliary supply for refeeding.

Other reproduction devices use, what is commonly termed, an inverter. An inverter effectively reverses the sheet orientation in its direction of motion. In other words, the lead edge and the trail edge orientation of the sheet is reversed. Depending on the location and orientation of the inverter, such reversal may also cause the sheet to be inverted (turned over). Generally, an inverter is associated with a sheet by-pass path and gate so that a sheet may selectively enter or by-pass the inverter, thus providing a choice between inversion and non-inversion. Inverters are very useful in many different reproduction applications, but suffer from reliability problems.

An example of an inverter for use in a recirculating document handler is U.S. Pat. No. 4,553,828 to Burger et al. that uses an inverting roller to selectively invert or not invert a sheet as it is fed back to a bottom feed supply tray. For duplex copying when the sheets are finally stacked, they are each inverted from their original orientation.

Another example is U.S. Pat. No. 4,384,782 to Acquaviva in which documents are top fed in 1–N order from a supply to a feed loop that selectively inverts the documents prior to reproduction and then restacks the originals from the bottom of the supply.

There are various known ways to control duplex reproduction. For example, in U.S. Pat. No. 4,278,344 to Sahay an inverter is actuated only during single document circulation and is inhibited during successions of contiguous plural document copying circulations. Thus opposite sides of the documents are copied in alternate successions. In U.S. Pat. No. 4,355,880 to Stemmle, copying documents in serial page order is accomplished by circulating the documents in a first and last circulation through a non-inverting reversing document path between the stack and the imaging station. Some devices, such as U.S. Pat. No. 4,468,114 to Pels et al., adjust the circulation based on the particular copy job for increased efficiency.

Additional circulation such as in the above devices to effect proper document orientation, however, adds time and increases energy consumption and thus adversely impacts efficiency and general wear on the reproduction machines. Reproduction devices must provide reliability and are generally required to have the ability to operate at high speed. It is also often desirable to provide compatible circulation of simplex and duplex documents in the same document handler.

SUMMARY OF THE INVENTION

One aspect of the invention is to decrease copy job time and energy requirements by employing only two passes for duplex reproduction. Such a design provides a simplified and shortened feed path. This also increases reliability of the machine by reducing the number of passes for all duplex print jobs and allows a device designed in accordance with the invention to effect 100% productivity.

An additional aspect of the invention is to allow for flexibility with respect to serial page order in the document supply. This invention allows feeding of original documents in an established order, including both 1–N pages and N–1 pages.

One embodiment of the invention provides a single input feeder with a dual feed head. Alternatively, separate feeders can be used without redesigning the feed head. The ability and latitude of an active retard feed head is also increased.

Another aspect of the invention is to provide an efficient control system. By this, document handling control can be provided directly from the automatic document feeder. Remote control is also possible.

An image reproduction device according to the invention can be operable in at least a simplex reproduction mode and a duplex reproduction mode. The device includes a feeder assembly that supports a stack of original document sheets in an established page order, such as 1–N or N–1. An image reproduction station creates an image based on each sheet of the original document, and a sheet transport with a feed path transports each original document sheet through the feed path from the feeder assembly past the image reproduction station. An output receives the stack of original document sheets in the same relative page order from the sheet transport with each successive sheet stacking on top of a previously output sheet. A controller is connected to the sheet transport and operates in a simplex mode in which each original document sheet passes through the feed path only once and a duplex mode in which each original document sheet passes through the feed path only twice.

According to this invention, a stack of original document sheets are fed through an image reproduction apparatus by the method of placing a stack of original document sheets in a feeder in an established page order and selecting one of a simplex reproduction mode and a duplex reproduction mode. Each of the sheets is fed through a feed path including an image reproduction station, wherein the sheets are fed through the feed path once in the simplex mode and twice in the duplex mode. The stack of original document sheets is output in the same relative page order with each sheet stacked on the previously output sheet.

The invention is also embodied in a recording medium that stores a control program for use by a reproduction apparatus. The control program includes instructions for selecting one of a simplex reproduction mode and a duplex reproduction mode for reproducing a stack of original document sheets arranged in an established page order. The program controls feeding of each of the sheets through a feed path including an image reproduction station, wherein the sheets are fed through the feed path once in the simplex mode and twice in the duplex mode, such that the stack of original document sheets are output in the same relative page order with each output sheet stacked on a previously output sheet.

Other aspects, advantages and salient features of the invention will be become apparent from the following detailed description, which taken in conjunction with the drawings discloses preferred embodiments of the invention.

BRIEF DESCRIPTION OF THE DRAWINGS

Referring to the drawings which form a part of this disclosure.

DETAILED DESCRIPTION OF PREFERRED EMBODIMENTS

To facilitate description of the preferred embodiments of the invention and for ease of understanding, certain consistent terminology is used herein to establish a frame of reference. Face up means that the first page of the document is facing upwardly as to be seen by the operator. Face down means that the first page of the document is facing downwardly, or upside down, as seen by the operator. Serial order refers to the page order with respect to the top of the stack. For example, a stack of pages 1, 2 and 3 face down would be in N–1 order. Documents in serial order described 1–N, can similarly be used in reverse order as N–1. Page number order means consecutive numerical order. These descriptions are not intended to be limiting but are rather for descriptive purposes only.

Figure 1:
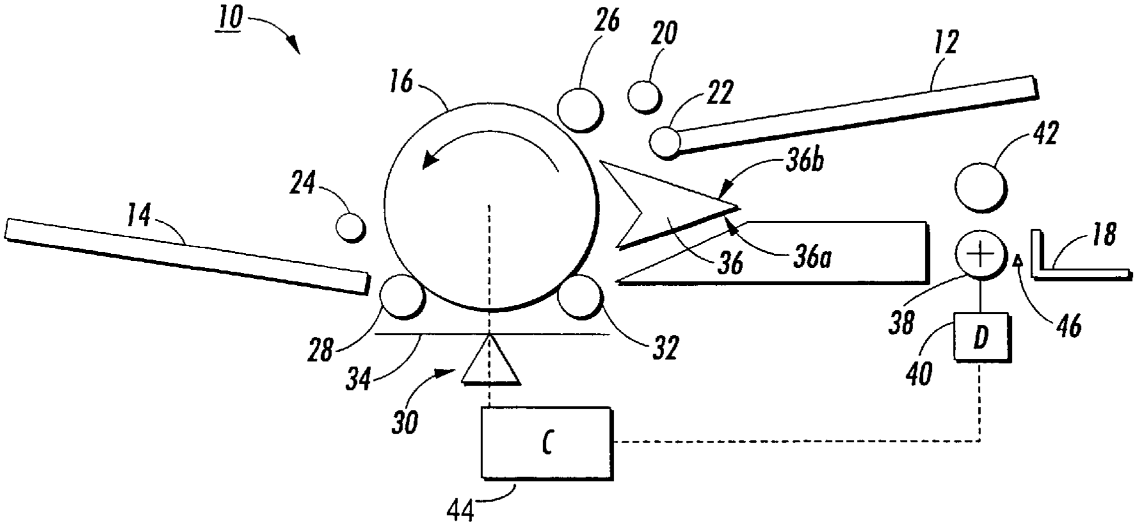
FIG. 1 is a schematic side view of an image reproduction device according to an embodiment of the invention.

FIG. 1 schematically shows the relevant portions of an image reproduction device 10, also referred to herein for simplicity as a copier, in accordance with this invention. The invention can be implemented in any type of reproduction device, including, but not limited to, a xerographic copy device, an optical scanner, and a facsimile machine. The elements shown in FIG. 1 substantially show an automatic document feeder (ADF).

According to the first embodiment, the image reproduction device 10 includes a first original document (also referred to as an original) supply 12 that has a sheet supporting surface. A second original document supply 14 is also provided. A stack of original documents are supported by first supply 12 or second supply 14 in an established page order such as 1–N pages or N–1 pages. First and second original document supply 12 and 14 can be configured as a tray or cassette or merely a supporting surface. Supplies 12 and 14 are also equipped with conventional sheet detecting mechanisms coupled to a controller 44, discussed below, to signal the presence of an original document in the supply.

A transfer roll 16 is located adjacent each supply to which sheets of the original document are initially fed. Roll 16 can be a conventional constant velocity transfer (CVT) roll as shown or can be embodied as a movable platen, drum or endless belt. Roll 16 transports the original document through the feed path.

A separate output 18 is provided for the original documents with a stacking surface upon which the originals are restacked after being reproduced. Output 18 can also be a tray or cassette or merely a supporting surface.

In conjunction with first supply 12, a supply feeder 20 is provided to selectively feed individual sheets of the original document to the transfer roll 16. Supply feeder preferably includes at least one driven nip roll that frictionally engages a single sheet from the stock of originals and feeds it to roll 16. FIG. 1 shows a nip roll 20 for top feeding of a sheet from the top of the stack and a bottom nip roll 22 for bottom feeding a sheet from the bottom of the stack. In practice, one nip roll could be provided for economy of both nip rolls (a dual feed head as discussed below) could be provided to increase flexibility of the machine by providing a choice of top feeding or bottom feeding. Any conventional feeding assembly such as a pair of nip rolls that work together for feeding or a feed belt could also be employed.

Similarly, a supply feeder is provided in conjunction with second supply 14 to selectively feed individual sheets of the original document to the transfer roll 16. FIG. 1 shows a driven nip roll 24 positioned to top feed a sheet from the top of the stack of originals. As discussed with respect to first supply 12, any conventional feeding assembly could be provided for feeding. Although top feeding is shown, the device could be configured to accommodate bottom feeding.

A take away roll (TAR) 26 is located adjacent transport roll 16 at the initial feed location to take the sheet from first supply 12 into the feed path. A roll 28 is provided upstream of an image reproduction station 30, and roll 32 is provided downstream of image reproduction station 30. Rolls 28 and 32 are commonly referred to as pre-rollers and post-rollers, respectively, and act to transport and support the document sheet as it passes image reproduction station 30. Preferably, rolls 28 and 32 are constant velocity transfer (CVT) rolls, but any conventional feeder mechanism could be used to transport the original sheets through the feed path past image reproduction station 30. Preferably, image reproduction station 30 includes a transparent support surface 34 through which an image on the original document can be reproduced using known methods.

A passive baffle 36 is provided downstream of image reproduction station 30. Baffle 36 guides sheets in the feed path along guide surface 36*a* from image reproduction station 30 toward output 18 to a reversible drive mechanism, shown as a duplex roll 38 operatively coupled to a drive 40. An idler roll 42 is provided opposed to duplex roll 38. Any reversible drive mechanism, such as a roll or belt could be used. A sheet detector 46 is provided adjacent to duplex roll 38 to detect a sheet and signal controller 44 to operate drive 40. A guide surface 36*b* is also provided on baffle 36 at an acute angle to guide surface 36*a* to guide an original sheet from duplex roll 38 back toward transfer roll 16 for a second pass over transfer roll 16 to image reproduction station 30.

Passive baffle 36 and reversible duplex roll 38 act to invert the sheet in the feed path so that a first side (page 2, for example) faces image reproduction device 30 in the first pass and a second opposed side of the original (page 1, for example) faces image reproduction device 30 in the second pass. After the second pass, the original is ejected by forward driving duplex roll 38 to output 18. It is also possible to use a pivoting diverter, in place of the passive baffle 36, that selectively guides sheets to the chosen feed path. Additionally, the passive baffle can be in the form of sheet guides.

A controller 44 is connected to transfer roll 16 and duplex roll 38 to selectively drive the rolls to transport the original sheet through the feed path in two passes. Controller 44 is also operatively connected to control the feeders associated with first supply 12 and second supply 14 and CVT rolls 28 and 32.

Preferably, controller 44 operates by one or more control programs. Such a control program is preferably implemented on a programmed general purpose computer. However, the control program can also be implemented on a special purpose computer, a programmed microprocessor or microcontroller and peripheral integrated circuit elements, in an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2 and 3, which are described below, can be used to implement the control program. The control program is preferably recorded on a storage medium, which can be embodied in any medium capable of storing a control program, including but not limited to a hard drive, a conventional floppy disk, compact disk or chip.

Figure 2:
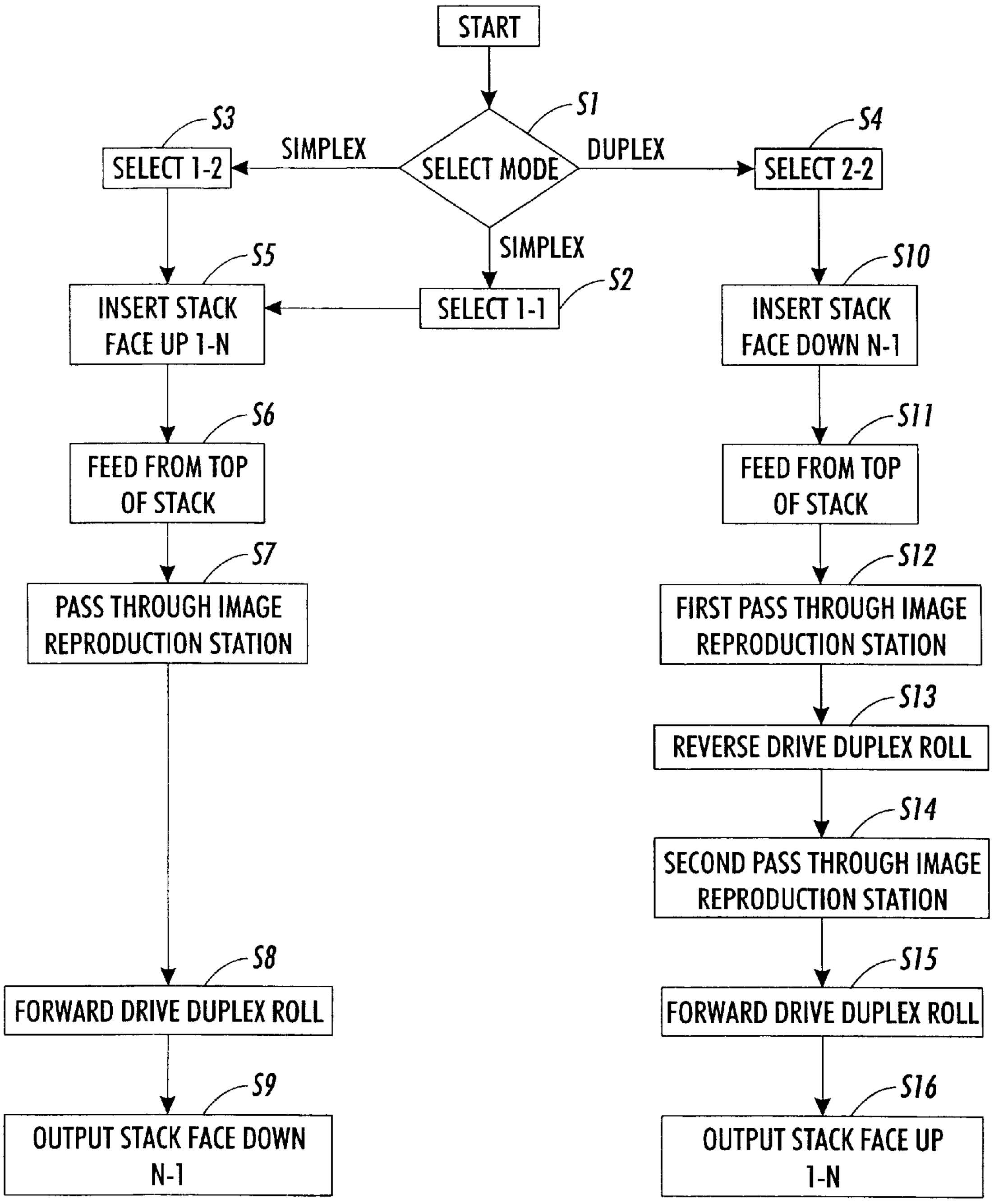
FIG. 2 is flow chart showing the operation of the invention according to an embodiment of the invention.

In the following description the various steps are represented by the reference symbol S. In operation, as shown in FIG. 2, the mode of reproduction is selected at S1. Selection may effected by manually actuating an input, such as by an operator via a control panel, sending a signal from a remote controller, such as a mainframe computer, or by merely placing a stack of original document sheets in the appropriate supply 12 or 14. The first possible mode is simplex 1-1 reproduction (S2) in which a one-sided original is reproduced on one side of a copy sheet. The second possible mode is Simplex 1-2 reproduction (S3) in which a one-sided original is reproduced on one side of a copy sheet and the next one-sided original is reproduced on the reverse side of the copy sheet. Both of these modes handle the original document sheets in the same manner. The third possible mode is duplex 2-2 reproduction (S4) in which a two-sided original is reproduced on both sides of a copy sheet. Of course, a two-sided original could be reproduced such that each side of the original is reproduced on a single copy sheet (2-1 reproduction), but such reproduction would be treated as simplex 1-1 reproduction in this system, and the original document sheets would require special handling as conventionally known.

For either simplex mode, the stack of original document sheets would be placed in the supply 12 face up for a top feeding assembly in 1–N page order in S5. The individual sheets in 1–N page order are then fed at S6 by supply feeder 20 from the top of the stack to transfer roll 16. At S7, each sheet travels through the feed path past roll 28 through image reproduction station 30 and past roll 32 to baffle 36. Because the original is supplied to supply 12 in a face-up orientation, as the sheet travels around transfer roll 16, the image is facing outwardly and therefore faces toward transparent surface 34 when it passes through image reproduction station 30. The sheet travels adjacent to guide surface **36*a* to duplex roll 38 at S8, which drives the sheet to output 18. Each sheet is discharged at S9 onto output 18 face down in N–1 order. Thus, in a single pass through the feed path, each original is reproduced and output in a collated stack in the same page order as when stacked in supply 12**.

In duplex mode S4, as shown in FIG. 2, the stack of original document sheets are placed in supply 14 face down in N–1 order in S10. The top sheet is then fed by supply feeder 24 to transfer roll 16 at S11. Each sheet passes through image reproduction station 30 via rolls 28 and 32 at S12 with the image facing down toward transparent surface 34 in a first pass. The sheet then travels through the feed path to baffle 36 adjacent guide surface **36*a* to duplex roll 38. When a sheet is detected by sheet detector 46, controller 44 operates drive 40 to reverse duplex roll 38 at S13 and drive the sheet back toward baffle 36 to guide surface 36*b* toward transfer roll 16. The side of the sheet that was facing outwardly on the first pass now faces toward transfer roll 16**.

The sheet travels through the feed path around transfer roll 16 via rolls 26, 28, and 32 for a second pass by image reproduction station 30 at S14. On the second pass, the opposite side of the original sheet faces transparent surface 34. The sheet is then driven toward baffle 36 and is guided past guide surface **36*a* to duplex roll 38, which now drives the sheet forward to output 18 at S15. The original sheet is then discharged to output 18 at S16 collated face up in 1**–N order. Thus, a third pass to flip the original sheet is not required. Since every pass through the feed path past the image reproduction station is used to reproduce the image from the original document sheet, 100% productivity can be realized.

Of course, the original stacks could be supplied in either 1–N or N–1 order and by adjusting the top or bottom feeding would be output in collated order as described above.

Alternatively, first supply 12 can function as both a simplex and duplex feeder. As such, a dual feed head is employed as noted above to top feed originals in a simplex mode or bottom feed originals in a duplex mode. In this case, second supply 14 is not needed and therefore need not be provided. The dual function supply could be located on either side of transfer roll 16 positioned as shown in FIG. 1 as supply 12 or as supply 14.

Figure 3:
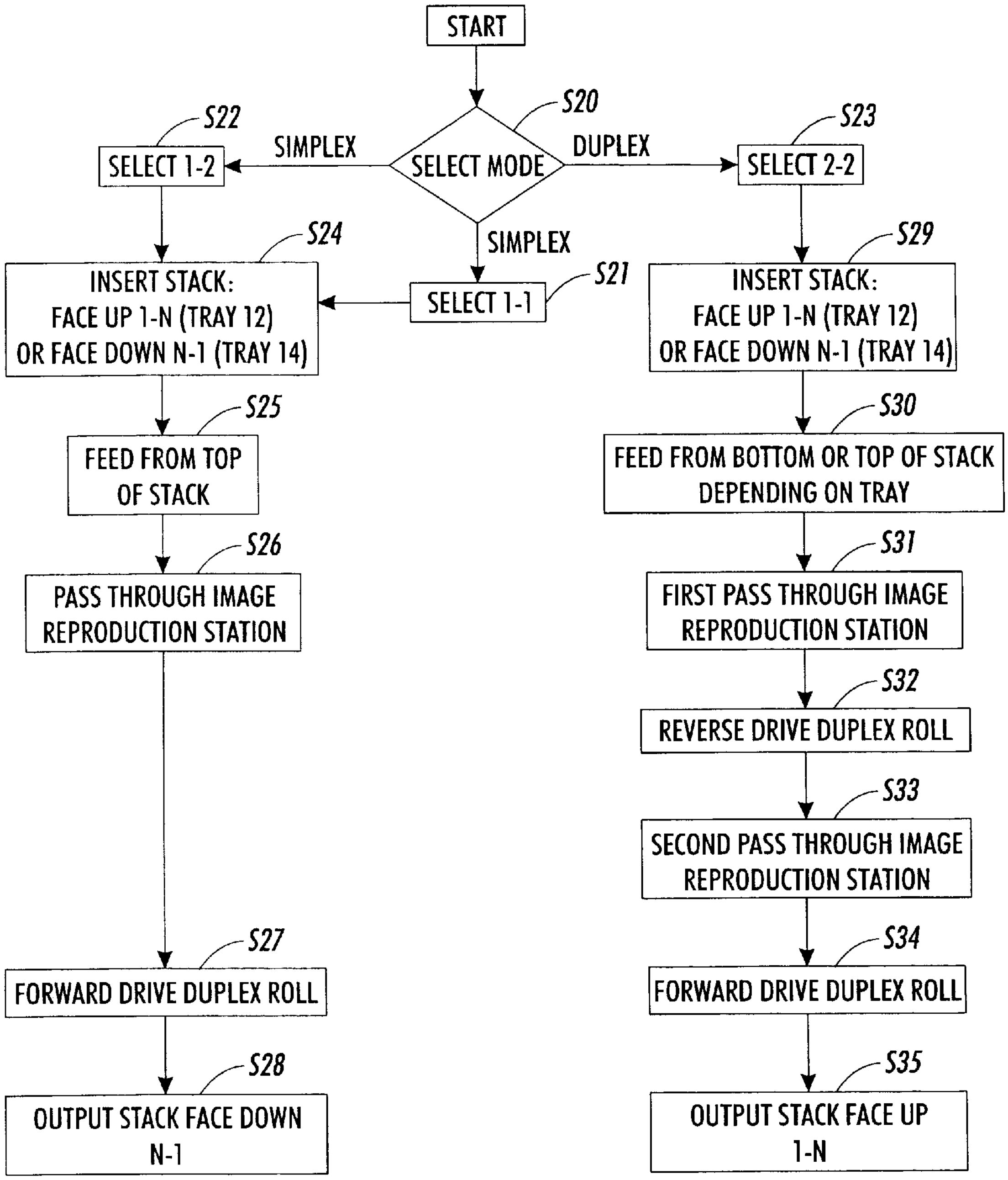
FIG. 3 is a flow chart showing the operation of the invention according to another embodiment of the invention.

Operation of the dual function supply is shown in FIG. 3. In the dual function supply, two supplies are not required as one supply can accept original documents for both simplex and duplex reproduction because the supply can top feed for simplex reproduction and bottom feed for duplex reproduction. For the sake of explanation, use of supply 12 as shown in FIG. 1 is described below. Alternatively, supply 14 could be provided for simplex feeding positioned as shown in FIG. 1 with the supply stack reoriented. For example, rather than providing the stack in supply 12 face up with top feed as described below, the stack could be supplied to supply 14 face down for bottom feeding.

First, the mode is selected in S20. As described above with respect to the process shown in FIG. 2, simplex 1-1 (S21), simplex 1-2 (S22), or duplex 2-2 (S23) can be selected. In either simplex mode S22 or S21, the stack of original document sheets is placed in supply 12 face up in 1–N order at S24 (or face down in supply 14 for bottom feeding.) Then, each sheet is fed by supply feeder 20 from the top of the stack in S25 to transfer roll 16. The sheet is transported through the feed path via rolls 26, 28 and 32. The sheet with the image facing outwardly away from transfer roll 16 passes through image reproduction station 30 at S26. As the sheet passes baffle 36, it is guided by guide surface 36*a* toward duplex roll 38. Controller 44 operates drive 40 to drive duplex roll 38 forward at S27. The sheet is discharged to output 18 at S28 collated face down in N–1 order. Alternatively, if the stack was supplied face down in N–1 order for bottom feeding from supply 14, the output stack would also be discharged face down in N–1 order.

For duplex reproduction (S23), a stack of original document sheets is placed in supply 12 face up in 1–N order or in supply 14 face down in N–1 order at S29. Each sheet is fed from the bottom of the stack from feeder 12 or from the top of the stack from feeder 14 in S30. Each sheet passes through image reproduction station 30 via rolls 28 and 32 at S31 with the image facing down toward transparent surface 34 in a first pass. The sheet then travels through the feed path to baffle 36 adjacent guide surface 36*a* to duplex roll 38. When a sheet is detected by sheet detector 46, controller 44 operates drive 40 to reverse duplex roll 38 at S32 and drive the sheet back toward baffle 36 to guide surface 36*b* toward transfer roll 16. The side of the sheet that was facing outwardly on the first pass now faces toward transfer roll 16.

The sheet travels through the feed path around transfer roll 16 via rolls 26, 28, and 32 for a second pass by image reproduction station 30 at S33. On the second pass, the opposite side of the original sheet faces transparent surface 34. The sheet is then driven toward baffle 36 and is guided past guide surface 36*a* to duplex roll 38, which how drives the sheet forward to output 18 at S34. The original sheet is then discharged to output 18 at S35 collated face up in 1–N order. Thus, a third pass to flip the original sheet is not required. Since every pass through the feed path past the image reproduction station is used to reproduce the image on the original document sheet, 100% productivity can be realized.

While advantageous embodiments have been chosen to illustrate the invention, it will be understood by those skilled in the art that various changes and modifications can be lade therein without departing from the scope of the invention as set forth in the appended claims.

What is claimed is:

1. An image reproduction device operable in at least a simplex reproduction mode and a duplex reproduction mode, comprising:

a feeder assembly that supports a stack of original document sheets in an established page order;

an image reproduction station that creates an image based on each sheet of the original document;

a sheet transport with a feed path that transports each original document sheet through the feed path from the feeder assembly past the image reproduction station;

an output that receives the stack of original document sheets with each successive sheet stacking on top of a previously output sheet in the same relative page order from the sheet transport; and a controller connected to the sheet transport that operates the sheet transport in a simplex mode in which each original document sheet passes through the feed path only once and a duplex mode in which each original document sheet passes through the feed path only twice;

wherein the sheet transport further includes a discharge transport connected to a driver that is driven by the controller in one direction to discharge the original document sheets to the output and in another direction to transport the original document sheets back to the image reproduction station.

2. The image reproduction device of claim 1, further comprising a selector connected to the controller to select between a simplex reproduction mode and a duplex reproduction mode.

3. The image reproduction device of claim 1, wherein the feeder assembly includes a simplex feeder that supports the stack of original document sheets face up and a duplex feeder that supports the stack of original document sheets face down.

4. The image reproduction device of claim 3, wherein the feeder assembly includes a supply transport that feeds from a top of the stack of original document sheets in the simplex feeder, and a supply transport that feeds from a top of the stack of original document sheets in the duplex feeder.

5. The image reproduction device of claim 1, wherein the sheet transport includes a document transporter arranged to support the original document sheet to face the image reproduction station.

6. The image reproduction device of claim 5, wherein the simplex feeder and the duplex feeder are located at opposite sides of the document transporter.

7. The image reproduction device of claim 5, wherein the sheet transport further includes a baffle arranged in the feed path to direct the original document sheet from the document transporter to the output.

8. The image reproduction device of claim 5, wherein the document transporter is a constant velocity roll.

9. The image reproduction device of claim 1, wherein the feeder assembly includes a feeder that supports a stack of original document sheets for simplex and duplex reproduction and a supply transport that feeds sheets from the top or bottom of the stack of original document sheets.

10. The image reproduction device of claim 9, wherein the sheet transport includes a document transporter arranged to support the original document sheet to face the image reproduction station.

11. The image reproduction device of claim 10, wherein the document transporter is a constant velocity roll.

12. The image reproduction device of claim 10, wherein the sheet transport further includes a baffle arranged in the feed path to direct the original document sheet from the document transporter to the output.

13. A method of feeding a stack of original document sheets through an image reproduction apparatus, comprising:

placing a stack of original document sheets in a feeder in an established page order;

selecting one of a simplex reproduction mode and a duplex reproduction mode;

feeding each of the sheets through a feed path including an image reproduction station, wherein the sheets are fed through the feed path once in the simplex mode and twice in the duplex mode; and outputting the stack of original document sheets with each sheet stacked on top of a previously output sheet in the same relative page order;

wherein feeding each sheet through the feed path comprises driving a discharge transport in one direction to output the sheets and a second direction to feed the sheets back through the feed path.

14. The method of claim 13, wherein feeding each of the sheets through the feed path includes selectively driving each original sheet toward the output or back toward the feed path based on the reproduction mode selection.

15. The method of claim 13, wherein placing the stack of original document sheets in a feeder includes selecting a simplex feeder or a duplex feeder.

16. The method of claim 15, wherein placing the stack of original document sheets in the simplex feeder includes placing the original document sheets face up, wherein the stack of original document sheets are output face down.

17. The method of claim 15, wherein placing the stack of original document sheets in the duplex feeder includes placing the stack of original document sheets face down, wherein the stack of original document sheets are output face up.

18. The method of claim 13, further including controlling top feeding or bottom feeding from the stack of original document sheets based on the reproduction mode selection.

19. The method of claim 18, wherein when the simplex reproduction mode is selected the original document sheets are output face down.

20. The method of claim 18, wherein when the duplex reproduction mode is selected the original document sheets are output face up.

21. The method of claim 18, wherein placing the stack of original document sheets in a feeder includes placing the original document sheets face up.

22. The method of claim 21, wherein when the simplex mode is selected, the stack of original document sheets are fed from the top of the stack.

23. The method of claim 21, wherein when the duplex mode is selected, the stack of original document sheets are fed from the bottom of the stack.

24. A recording medium that stores a control program for use by a reproduction apparatus, the control program including instructions for:

selecting one of a simplex reproduction mode and a duplex reproduction mode for reproducing a stack of original document sheets arranged in an established page order; and controlling feeding each of the sheets through a feed path including an image reproduction station, wherein the sheets are fed through the feed path once in the simplex mode and twice in the duplex mode, such that the stack of original document sheets are output in the same relative page order with each output sheet stacked on a previously output sheet, including driving a discharge transport in one direction to output the sheets and a second direction to feed the sheets back through the feed path.

25. The recording medium of claim 24, including instructions for controlling top feeding or bottom feeding from the stack of original document sheets based on the reproduction mode selection.

26. The recording medium of claim 24, wherein controlling feeding of each of the sheets through the feed path includes selectively driving each original sheet toward the output or back toward the feed path based on the reproduction mode selection.

27. The recording medium of claim 24 in combination with a reproduction apparatus.

28. An image reproduction device operable in at least a simplex reproduction mode and a duplex reproduction mode, comprising:

a feeder assembly that supports a stack of original document sheets in an established page order;

an image reproduction station that creates an image based on each sheet of the original document;

a sheet transport with a feed path that transports each original document sheet through the feed path from the feeder assembly past the image reproduction station;

an output that receives the stack of original document sheets with each successive sheet stacking on top of a previously output sheet in the same relative page order from the sheet transport; and a controller connected to the sheet transport that operates in a simplex mode in which each original document sheet passes through the feed path only once and a duplex mode in which each original document sheet passes through the feed path only twice, wherein the simplex feeder and the duplex feeder are located at opposite sides of the document transporter.

29. The image reproduction device of claim 28, further comprising a selector connected to the controller to select between a simplex reproduction mode and a duplex reproduction mode.

30. The image reproduction device of claim 28, wherein the feeder assembly includes the simplex feeder that supports the stack of original document sheets face up and the duplex feeder that supports the stack of original document sheets face down.

31. The image reproduction device of claim 30, wherein the feeder assembly includes a supply transport that feeds from a top of the stack of original document sheets in the simplex feeder, and a supply transport that feeds from a top of the stack of original document sheets in the duplex feeder.

32. The image reproduction device of claim 28, wherein the sheet transport includes a document transporter arranged to support the original document sheet to face the image reproduction station.

33. The image reproduction device of claim 32, wherein the document transporter is a constant velocity roll.

34. The image reproduction device of claim 32, wherein the sheet transport further includes a baffle arranged in the feed path to direct the original document sheet from the document transporter to the output.

35. The image reproduction device of claim 34, wherein the sheet transport further includes a discharge transport connected to a driver that is driven by the controller in one direction to discharge the original document sheets to the output and in another direction to transport the original document sheets back to the image reproduction station.

36. The image reproduction device of claim 28, wherein the feeder assembly includes a feeder that supports a stack of original document sheets for simplex and duplex reproduction and a supply transport that feeds sheets from the top or bottom of the stack of original document sheets.

37. The image reproduction device of claim 36, wherein the sheet transport includes a document transporter arranged to support the original document sheet to face the image reproduction station.

38. The image reproduction device of claim 37, wherein the document transporter is a constant velocity roll.

39. The image reproduction device of claim 37, wherein the sheet transport further includes a baffle arranged in the feed path to direct the original document sheet from the document transporter to the output.

40. The image reproduction device of claim 37, wherein the sheet transport further includes a discharge transport connected to a driver that is driven by the controller in one direction to discharge the original document sheets to the output and in another direction to transport the original document sheets back to the document transporter for a second pass by the image reproduction station.

41. A method of feeding a stack of original document sheets through an image reproduction apparatus, comprising:

placing a stack of original document sheets in a feeder in an established page order wherein a simplex feeder and a duplex feeder are located at opposite sides of the image reproduction apparatus;

selecting one of a simplex reproduction mode and a duplex reproduction mode;

feeding each of the sheets through a feed path including an image reproduction station, wherein the sheets are fed through the feed path once in the simplex mode and twice in the duplex mode; and outputting the stack of original document sheets with each sheet stacked on top of a previously output sheet in the same relative page order.

42. The method of claim 41, wherein feeding each of the sheets through the feed path includes selectively driving each original sheet toward the output or back toward the feed path based on the reproduction mode selection.

43. The method of claim 41, wherein placing the stack of original document sheets in a feeder includes selecting the simplex feeder or the duplex feeder.

44. The method of claim 43, wherein placing the stack of original document sheets in the simplex feeder includes placing the original document sheets face up, wherein the stack of original document sheets are output face down.

45. The method of claim 43, wherein placing the stack of original document sheets in the duplex feeder includes placing the stack of original document sheets face down, wherein the stack of original document sheets are output face up.

46. The method of claim 41, further including controlling top feeding or bottom feeding from the stack of original document sheets based on the reproduction mode selection.

47. The method of claim 46, wherein when the simplex reproduction mode is selected the original document sheets are output face down.

48. The method of claim 46, wherein when the duplex reproduction mode is selected the original document sheets are output face up.

49. The method of claim 46, wherein placing the stack of original document sheets in a feeder includes placing the original document sheets face up.

50. The method of claim 49, wherein when the simplex mode is selected, the stack of original document sheets are fed from the top of the stack.

51. The method of claim 49, wherein when the duplex mode is selected, the stack of original document sheets are fed from the bottom of the stack.

52. A recording medium that stores a control program for use by a reproduction apparatus, the control program including instructions for:

selecting one of a simplex reproduction mode and a duplex reproduction mode for reproducing a stack of original document sheets arranged in an established page order with a simplex feeder and a duplex feeder located at opposite sides of the reproduction apparatus; and controlling feeding each of the sheets through a feed path including an image reproduction station, wherein the sheets are fed through the feed path once in the simplex mode and twice in the duplex mode, such that the stack of original document sheets are output in the same relative page order with each output sheet stacked on a previously output sheet.

53. The recording medium of claim 52, including instructions for controlling top feeding or bottom feeding from the stack of original document sheets based on the reproduction mode selection.

54. The recording medium of claim 52, wherein controlling feeding of each of the sheets through the feed path includes selectively driving each original sheet toward the output or back toward the feed path based on the reproduction mode selection.

55. The recording medium of claim 52 in combination with a reproduction apparatus.

* * * * *